United States Patent [19]

Feldmann

[11] Patent Number: 5,207,299
[45] Date of Patent: May 4, 1993

[54] BRAKE SLACK ADJUSTER WITH ELECTRONIC CONTROL AND DISTANCE SENSORS

[75] Inventor: Joachim Feldmann, Neustadt, Fed. Rep. of Germany

[73] Assignee: WABCO Westinghouse Fahrzeugbremsen GmbH, Hannover, Fed. Rep. of Germany

[21] Appl. No.: 710,814

[22] Filed: Jun. 5, 1991

[30] Foreign Application Priority Data

Jun. 5, 1990 [DE] Fed. Rep. of Germany ....... 4017950

[51] Int. Cl.⁵ .................. F16D 65/52; G01D 5/12; B60T 17/18; B61H 15/00
[52] U.S. Cl. ................ 188/79.55; 188/1.11; 188/196 BA; 188/79.51; 192/111 A
[58] Field of Search ........... 188/1.11, 79.51, 79.54, 188/79.55, 79.56, 196 R, 196 B, 196 BA; 192/111 A

[56] References Cited

U.S. PATENT DOCUMENTS

| | | | |
|---|---|---|---|
| 3,339,676 | 5/1967 | Quinn | 188/1.11 |
| 3,356,188 | 12/1967 | Goldman et al. | 188/79.55 |
| 3,412,830 | 11/1968 | Bushnell | 188/196 R X |
| 4,620,618 | 11/1986 | Monick | 188/79.55 X |
| 4,705,151 | 11/1987 | Leigh-Monstevens et al. | 192/111 A |
| 4,749,063 | 6/1988 | Garrett et al. | 188/79.51 X |
| 4,756,397 | 7/1988 | Deligny | 192/111 A |
| 4,875,557 | 10/1989 | Hagin et al. | 188/79.55 |

FOREIGN PATENT DOCUMENTS

| | | | |
|---|---|---|---|
| 1551663 | 12/1968 | France | 188/1.11 |
| 2034428 | 6/1980 | United Kingdom | 188/1.11 |

Primary Examiner—Matthew C. Graham
Assistant Examiner—Josie A. Ballato
Attorney, Agent, or Firm—Horst M. Kasper

[57] ABSTRACT

A brake actuating device is furnished with a device for slack readjustment of a brake, in particular of a vehicle brake. Defects in the area of the slack readjustment device can result in an erroneous and defective brake behavior. The invention device furnishes a continuous control of the brake release gap and of the brake lining wear. The motion of the brake mechanism is used for the generation of a first measurement distance (s). The motion of the slack readjustment device (5, 7) is used for the generation of a second measurement distance (n). A regulating distance (q), formed by a superpositioning of the measurement distances (s) and (n), can be scanned and recorded with a distance sensor (17) of a signal generator (18). The signal, corresponding to the regulating distance (q), can be transformed into signals corresponding to the measurement distances (s) and (n) in an evaluation device. The evaluation device serves for a continuous surveillance and monitoring of the brake release gap and of the brake lining wear at a vehicle or in a diagnostic center, where the evaluation device can be connected to the vehicle.

21 Claims, 3 Drawing Sheets

BRAKE SLACK ADJUSTER WITH ELECTRONIC CONTROL AND DISTANCE SENSORS

BACKGROUND OF THE INVENTION

1. Field of the Invention

The invention relates to a brake actuating device with a means for readjusting a brake, in particular a vehicle brake, where a brake lever is furnished, which brake lever performs together with a brake shaft a pivoting motion around a rotation axis of the brake shaft, which pivoting motion results in an actuation of a brake in the sense of an overcoming of a brake release gap for the purpose of engaging a brake lining contacting two brake drums.

2. Brief Description of the Background of the Invention Including Prior Art

A device of the kind recited above is known from the German Patent DE-PS 1,480,038. The known device includes a slack readjustment device, which allows to adjust the position parts of a brake actuator relative to each other, namely adjusting the position of a brake linkage rod and of a brake lever disposed on the brake shaft. The adjustment serves to provide a continuous readjustment of the position of the parts of the brake actuator in the sense of a maintaining of a preset brake release gap. This readjustment is performed to assure a uniform response behavior of the brakes or, respectively, a uniform brake behavior which, last but not least, is subject matter of corresponding legal and/or regulatory requirements regarding driving safety.

Wear or defects of the slack readjustment device and of its actuating mechanism can, however, effect a deficient readjustment with the consequence that the brake release gap, predefined by the brake type, can no longer be maintained in the course of the driving operation and then does no longer correspond to the actual brake lining wear. A defective readjustment or a complete lack of a readjustment is recognizable in the recited device only by a changing brake actuating stroke, by a decrease in the braking effect, or by a failing of the braking effect. However, this undesired change of the brake release gap occurs only gradually and usually over a longer period of time and is therefore initially hardly perceivable. Therefore, there exists a need to give the operator the certainty with regard to the actual state of the brake release gap and/or the wear of the brake lining for safety reasons.

The German Patent DE-PS 2,427,049 to Kurt Oelsch teaches an electrical distance regulator. A contact pin is guided along a straight line, a common casing is furnished for the contact pin and for an input member. The input member is led in a straight direction perpendicular to the contact pin and the input member with the inclined face forms an easily exchangeable component group in the casing. This reference shows operation of a regulator pin.

The German Patent Application Laid Out DE-OS 2,520,851 to Peter Lehner teaches a device with a regulator member for capturing the effect of a moving element on a scanning system. A contact pin of the capturing system is disposed slidable perpendicular to the direction of motion of a wedge-shaped element for changing of the switching duration. This reference shows that the regulator member can be used to change the switching time.

The German Patent Application Laid Out DE-AS 1,258,445 to Anton Höhner teaches a device for the monitoring of the brake position and of the wear state of the brake shoes at disc brakes of rail vehicles, where the disc brakes act together with automatic brake actuation regulators. The brake actuation regulators, connected to the brake piston, and the brake actuator are in each case connected with indicator shafts, disposed perpendicular to the vehicle longitudinal axis in a horizontal direction for the transformation of the axial motion into a rotation motion. Indicators are disposed at ends of the indicator shafts, protruding on the two vehicle sides via bogie or truck side rails in front of scales. This reference shows that the brake condition can be displayed on a scale.

The German Patent Document DE-OS 2,318,331 to Fritz Nigg et al. teaches an electronic scanning device with levers. A second lever of a switching mechanism can be disposed pivotable on the first lever of the mechanism and the motions of the movable element are controlled by a transducer. This second lever is subject to the effect of an elastic element and of two stop means, such that the first stop means is in an operating connection with the two levers and acts against the force of the elastic element. The reference teaches that the pivoting motion of the second lever can be limited versus the first lever in the direction of the elastic element, if the first lever is pivoted opposite to the force of the elastic element. This reference shows that lever actions can be electronically captured.

The German Printed Patent Publication DE-OS 3,738,294 to Jochen Hahne et al. teaches a safety device for an automatic slack adjuster upon malfunctioning of same in a brake actuator of rail vehicles. After a certain level of force has been surpassed, a support device allows a spatial change of the control stop, whereby a signal indicator, connected to the control stop, transfers these changes of the starting position to a display. The reference teaches that changes relative to a starting position are shown on a display.

The German Petit Patent Application 6,752,413 to Willi Scholz teaches a slack adjuster. The adjuster is equipped with an only rotary supported readjustment means, i.e. a collar, a readjustment wheel, preferably a readjustment rotary disc, which readjustment means is furnished with recesses or protrusions, respectively, serving as counter support, and distributed along an imaginary subdivision circle. The reference teaches a readjustment of slack adjusters relative to a previously maintained position.

The German Printed Patent Document DE-OS 1,455,913 to Leo Goldman et al. teaches a device for the display of the wear of brake linings. The reference teaches a rotary mounted cam shaft, which carries a cam disposed between spreadable brake shoes. The brake shoes are furnished with brake linings. The brake linings can come to a rest position at a drum. An adjustment lever, adjustable in a rotary manner, is connected to the cam shaft. The reference teaches an adjustment of a brake shoe relative to a brake lining.

The German Democratic Republic Patent DD-PS 274,087 to Torsten Schmandke teaches a device for generating digital signals, which reflect tolerance deviations of rotating or linearly moving bodies. The reference teaches that the deviations from a set position of a mechanical element can be represented by digital signals.

The German Printed Patent Document Laid Open DE-OS 3,713,562 to Eckehard Schmitz teaches a method for determining the position of adjustment elements with inductive direction indicators.

The German Printed Patent Document Laid Open DE-OS 3,242,537 to Roland Schempp teaches an electromagnetic adjustment device.

The German Printed Patent Document Laid Open DE-OS 3,010,498 to Peter Liermann et al. teaches a device for measuring the brake lining wear.

A brake lever with an automatic readjustment of the brake operating shaft, is known from the European Patent Document EP 0,030,766 A1. The reference EP 0,030,766 A1 teaches the drive of the slack readjustment device to be furnished by a gear wheel, by a worm connected fixed against rotation to the gear wheel, and by a worm wheel drivable by a worm, instead of the gear rack and the pinion of the present invention. The drive of the slack readjustment device is also always moved between end stops of a most motion device in two direction during a brake lever turn.

In case of a defect or deficiency of the above-recited and described slack readjustment device, i.e. if the wear of the brake elements, caused by the driving operation, is not compensated by an adjustment of the brake operating shaft relative to the brake lever, then a brake lever turn occurs during brake actuation which surpasses the final position.

A device for the display of the brake lining wear of heavy road vehicles such as, for example, trucks, buses, pulling machines or the like is taught in the German Printed Patent Publication DE-OS 2,248,927 to Helmut Hase. The reference teaches to employ a switch 19, actuated by contact pin 15, which is connected to display member.

SUMMARY OF THE INVENTION

1. Purposes of the Invention

It is an object of the present invention to furnish a brake actuating device of the initially recited kind and to improve such device with simple means for continuously scanning and capturing an actuating stroke of the brake actuator, corresponding to the brake release gap, and for compensating a wear of the brake lining.

It is another object of the present invention to provide means within the framework of a standard brake actuator for transducing signals corresponding to the wear of the brake lining.

It is yet another object of the present invention to provide a monitoring system for brakes, in particular in motor vehicles, which controls the condition of the brake lining.

These and other objects and advantages of the present invention will become evident from the description which follows.

2. Brief Description of the Invention

The present invention provides for a brake actuating device with a means for slack readjustment of a brake, in particular of a vehicle brake. A worm wheel is disposed fixed against rotation on a brake shaft. A brake lever performs together with the brake shaft a pivoting motion around a rotation axis of the brake shaft. The pivoting motion of the brake lever serves for actuation of a brake in the sense of overcoming a brake release gap for the purpose of bringing a brake lining closer to a brake drum. A slack readjustment device is connected to and between the brake lever and the brake shaft. The brake shaft is adjustable relative to the brake lever around the rotation axis of the brake shaft by means of the slack readjustment device, in the sense of a maintaining of the brake release gap upon wear of the brake lining, and including a worm engaging the worm wheel thereby forming the slack readjustment device in a kind of a coupling structure. A regulating member is connected to the slack readjustment device and actuatable depending on the pivoting motion of the brake lever for generating a first measurement distance s corresponding to an overcoming of a brake release gap. The regulating member is further actuatable depending on the adjustment motion of the slack readjustment device for generation of a second measurement distance n, corresponding to the brake lining wear. The regulating member is adapted for superpositioning the first measurement distance s and the second measurement distance n to generate a regulating distance q from a superpositioning of the distance s and of the distance n. A distance sensor is engaged by the regulating member. A signal generator is connected to the distance sensor and serves for scanning the regulating distance q and for generating a signal corresponding to the regulating distance q. An evaluation device is connected to the signal generator for comparing the characteristics of the first measurement distance s and of the second measurement distance n and for decomposing a signal corresponding to the regulating distance q into a first signal s' corresponding to the first measurement distance s, and into a second signal n' corresponding to the second measurement distance n.

The regulating member can include a control cam disposed eccentrically relative to the rotation axis of the worm of the slack readjustment device. The control cam can be tilted around a rotation axis of the worm and with respect to the distance sensor for generation of the first measurement distance s. The regulating member can include a face inclined relative to the rotation axis of the worm. The face can be shifted in a longitudinal direction relative to the rotation axis of the worm and of the distance sensor for generating the second measurement distance n.

The second measurement distance n can be generated depending on the adjustment motion of the worm of the slack readjustment device.

The worm can be disposed in the brake lever. The worm can include an extension forming a single piece with the worm. Alternatively, the extension can be connected to the worm and fixed in position against rotation relative to the worm. The extension can extend outside of the brake lever. A transfer mechanism can be disposed between the extension and the regulating member for transforming an adjustment motion of the worm into a motion of the regulating member in a direction disposed parallel to the rotation axis of the worm.

The transfer mechanism can be formed by an inner thread of the regulating member. The inner thread can be engaged with an outer thread disposed fixedly against rotation relative to the extension.

The outer thread, fixedly disposed relative to the extension, can further be disposed on a bush surrounding the extension. The bush can be fixed against rotation relative to the extension.

A locking mechanism can operate between the bush and the extension. The locking mechanism can bring the bush and the extension into a desired locking and engagement position.

A drive can be disposed at and connected to the automatic slack readjustment device and can serve for actuating the automatic slack readjustment device. The drive can carry out a relative motion relative to the brake lever in dependence of the pivoting motion of the brake lever. The drive can include a pinion rotatable jointly with the pivoting motion of the brake lever. The rotation motion of the pinion can serve for generating the first measurement distance s and can be transfered onto the regulating member. The pinion can be disposed in the brake lever and can be connected, fixed against rotation, to the regulating member.

The connection of the pinion to the regulating member can be fixed against rotation and can be formed by a plug connector. The plug connector can allow a longitudinal shifting of the regulating member relative to its shifting axis.

The distance sensor connected to the signal generator can be formed as a contact pin. The contact pin can be engaged with the regulating member for furnishing the regulating distance q.

A signal, corresponding to the non-actuated state of the brake device, can be fed to the evaluation device and can serve there for a recognition of the measurement distance n.

A method for actuating a brake device comprises the following steps. A brake lever is pivoted together with a brake shaft over an angle around a rotation axis of the brake shaft. A brake is actuated in the sense of overcoming a brake release gap for the purpose of bringing a brake lining closer to a brake drum based on the pivoting motion of the brake lever. A worm wheel is engaged with a worm forming part of a slack adjustment device. The worm wheel is disposed fixed against rotation on the brake shaft. The slack readjustment device is formed in a kind of a worm drive. The position of the brake shaft relative to the brake lever around the rotation axis of the brake shaft is adjusted by means of the slack readjustment device, connected to and between the brake lever and the brake shaft, in the directional sense of a maintaining of the brake release gap upon wear of the brake lining. A regulating member, connected to the slack readjustment device, is actuated based on the pivoting motion of the brake lever for generating a first measurement distance s corresponding to an overcoming of a brake release gap. Said regulating member is actuated depending on the adjustment motion of the slack readjustment device for generation of a second measurement distance n, corresponding to the brake lining wear. The first measurement distance s and the second measurement distance n are superpositioned to generate a regulating distance q from a superpositioning of the distance s and of the distance n with said regulating member. A distance sensor is engaged with the regulating member for generating a signal. The signal from the distance sensor is fed to a signal generator connected to the distance sensor. The regulating distance q is scanned in the signal generator.

A signal corresponding to the regulating distance q is generated in the signal generator. The signals generated in the signal generator are fed to an evaluation device connected to the signal generator. The characteristics of the first measurement distance s and of the second measurement distance n are compared in the evaluation device.

A signal corresponding to the regulating distance g can be decomposed into a first signal s' corresponding to the first measurement distance s, and can be decomposed into a second signal n' corresponding to the second measurement distance n.

The invention can be economically performed by utilization of a control system based on commercially available distance sensors.

The invention provides the possibility to test and evaluate the condition or, respectively, the operating behavior of a brake device in an electronic diagnostic system. The electronic diagnostic system can be set up in a workshop or garage or which electronic diagnostic system can form part of a vehicle.

The invention can be performed with any suitable brake lever, independent of the particular kind of actuating mechanism acting on the brake lever. By way of example only, brake cylinders actuable with compressed air or brake fluid are suitable for this purpose.

The present invention increases the operating safety of the brake system, which is advantageous in particular in vehicles. This holds in particular, where the slack readjustment device is disposed in the brake lever and where consequently a visual monitoring of a wear of brake elements is hardly possible.

An additional advantage of the invention comprises embodiments furnishing a connection of the monitoring device to function elements of the brake lever. Protection is thereby achieved against environmental influences prevailing at the vehicle.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention.

DESCRIPTION OF INVENTION AND PREFERRED EMBODIMENT

Figure 1:
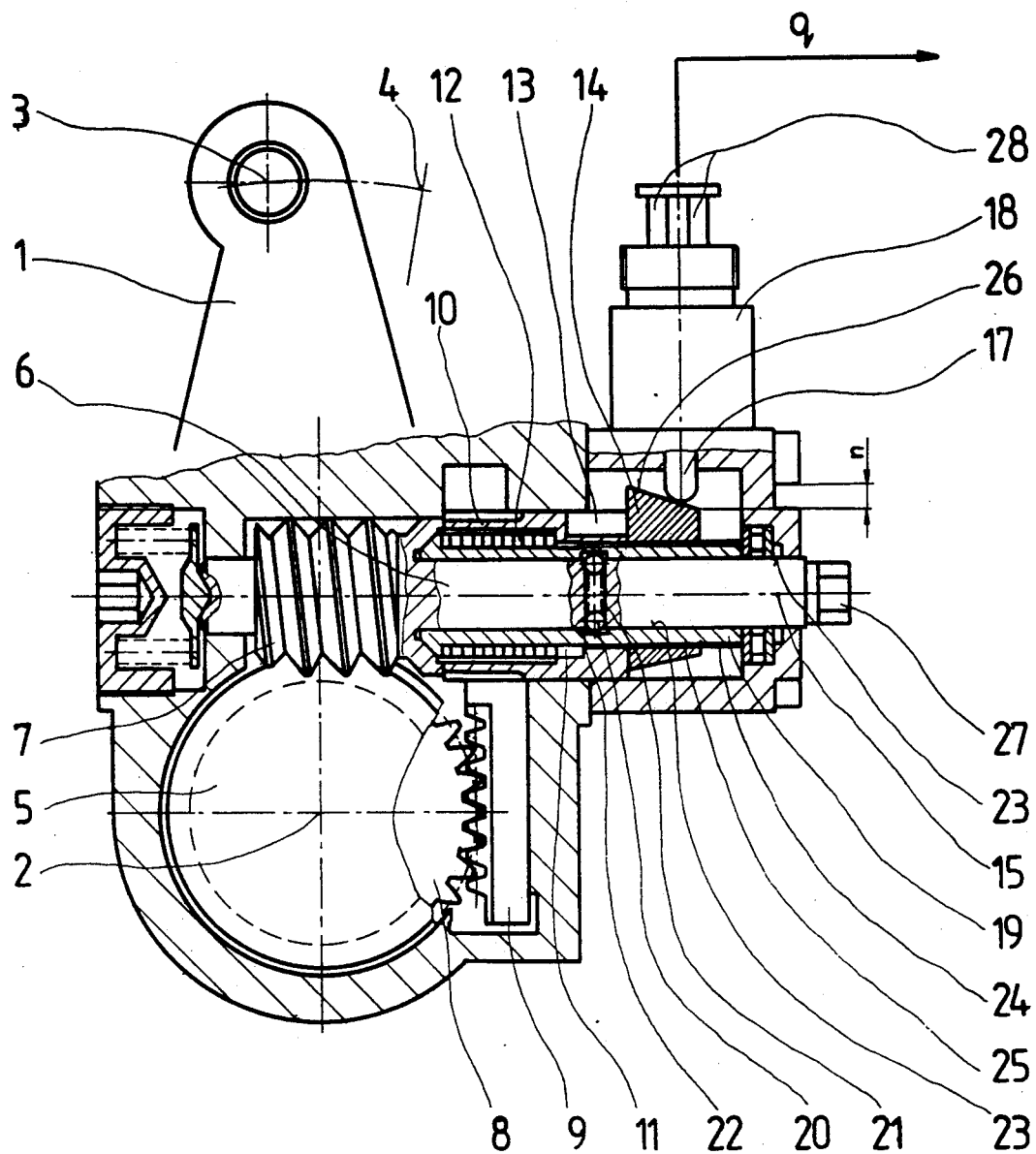
FIG. 1 is an in part sectional view of a brake readjustment device with means for monitoring the brake actuating stroke and the brake lining wear.

The invention device is provided to monitor the functioning of the slack readjustment device for maintaining a nearly constant brake release gap as well as to monitor the brake lining wear.

According to the present invention there is provided for a brake actuating device with a means for slack readjustment of a brake, in particular of a vehicle brake.

A brake lever performs together with a brake shaft a pivoting motion around a rotation axis of the brake shaft. The pivoting motion serves for actuation of a brake in the sense of overcoming a brake release gap for the purpose of bringing a brake lining closer to a brake drum. A slack readjustment device is furnished between the brake lever and the brake shaft. The brake shaft is adjustable relative to the brake lever around the rotation axis of the brake shaft by means of the slack readjustment device, in the sense of a maintaining of the brake release gap upon wear of the brake lining. A worm wheel, disposed fixed against rotation on the brake shaft, and a worm engaged with the worm wheel thereby form the slack readjustment device in a kind of a worm gearing. A regulating member 14 is furnished which can be actuated for generating a first measurement distance s, corresponding to the overcoming of the brake release gap, depending on the pivoting motion of the brake lever 1. The regulating member 14 is actuatable further for generation of a second measurement distance n, corresponding to the brake lining wear, depending on the adjustment motion of the slack readjustment device 5, 7. A regulating distance q can be generated with the regulating member 14. The regulating distance q is formed from superpositioning the first measurement distance s and the second measurement distance n. A signal generator 18 is furnished with a distance sensor 17. The signal generator 18 serves for scanning the regulating distance q and generates a signal corresponding to the regulating distance q. An evaluation device is furnished with which a comparison of the characteristics of the measurement distances s and n can be performed. The signal, corresponding to the regulating distance q, can be decomposed into a first signal s' corresponding to the first measurement distance s, and into a second signal n' corresponding to the second measurement distance n.

An automatic slack readjustment device 5, 7 can be furnished with a drive 8, 9, 10. The drive 8, 9, 10 can serve for an actuation of the automatic slack readjustment device 5, 7. The drive 8, 9, 10 can carry out a relative motion relative to the brake lever in dependence of the pivoting motion of the brake lever. The drive 8, 9, 10 can exhibit a pinion 10 rotatable with the pivoting motion of the brake lever 1. The rotation motion of the pinion 10, serving for a generation of the first measurement distance s, can be transfered onto the regulating member 14. The pinion 10 can be disposed in the brake lever 1 and can be connected, fixed against rotation, to the regulating member 14. The connection of the pinion 10 with the regulating member 14 can be fixed against rotation and can be formed by a plug connector 13. The plug connector 13 can allow a longitudinal shifting of the regulating member 14 relative to its shifting axis 15.

The regulating member 14 can exhibit a control cam 16, disposed eccentrically relative to the rotation axis 15 of the worm 7 coordinated to the slack readjustment device 5, 7. The control cam 16 can be tilted around the rotation axis 15 of the worm 7 and with respect to the distance sensor 17 for generation of the first measurement distance s. The regulating member 14 can exhibit a face 26 inclined relative to the rotation axis 15 of the worm 7. The face 26 can be shifted in longitudinal direction relative to the rotation axis 15 of the worm 7 and of the distance sensor 17 for a generation of the second measurement distance n. The second measurement distance n can be generated, depending on the adjustment motion of the worm 7, coordinated to the slack readjustment device 5, 7.

The worm 7 can be disposed in the brake lever 1 and can exhibit an extension 6, forming one piece with the worm 7 or connected, fixed against rotation to the worm 7. The extension 6 can extend outside of the brake lever 1. A transfer mechanism 24, 25 can be furnished between the extension 6 and the regulating member 14 for transforming the adjustment motion of the worm 7 into a motion of the regulating member 14 alongside of the rotation axis 15 of the worm 7. The transfer mechanism 24, 25 can be formed by an inner thread 25 of the regulating member 14. The inner thread 25 can be engaged with an outer thread 24, connected fixed against rotation to the extension 6. The outer thread 24, coordinated to the extension 6, can be disposed on a bush 19. The extension 6 can be surrounded by the bush 19 and connected, fixed against rotation, to the bush 19. A locking mechanism 20 can be furnished and can act between the bush 19 and the extension 6. The bush 19 and the extension 6 can be brought by the locking mechanism 20 into an arbitrary locking and engagement position.

The distance sensor 17 of the signal generator 18 can be formed as a contact pin 17. The contact pin 17 can be engaged with the regulating member 14 for generation of the regulating distance q.

A signal, corresponding to the non-actuated state of the brake device, can be fed to the evaluation device and can serve there for a recognition of the measurement distance n.

The brake actuating device includes according to FIG. 1 a brake lever 1, which is disposed on a brake operating shaft 2 as well as an operating member, connected to the brake lever and not illustrated, such as for example a brake cylinder actuated by a pressure means. The brake lever 1 with the brake operating shaft 2 is pivotable around a rotation axis of the brake operating shaft 2 by means of the operating member. The brake lever turn angle, covered during the pivoting of the brake lever 1 between a predefined initial position 3 and a final position 4 corresponds to a closing of a release gap by the brake elements, such as for example between brake shoe and brake drum, until the brake shoe engages the brake drum during a brake actuation.

The slack readjustment device 5, 7 can be provided by a gear coupling including a worm wheel 5 and a worm 7 and disposed between the brake operating shaft 2 and the brake lever 1. In order to maintain a preset brake release gap independent of the wear of the brake elements including a brake lining and a brake drum, the brake actuating shaft 2 is adjustable versus and relative to the brake lever 1, corresponding to a wear of, for example, the lining of a brake drum. This readjustment effects that the maximum brake lever turn during a brake actuation remains nearly unchanged between an initial position 3 and a final position 4. A deviation therefrom in preset and predefined limits should finally only be occurring when caused by a variable temperature rise of the brake drum.

The slack readjustment device 5, 7 can be actuated by a drive 8, 9, 10. The drive 8, 9, 10 comprises a gear wheel 8, disposed rotatable around the brake operating shaft 2 and disposed relative to the brake lever 1, a gear rack 9, engaging the gear wheel 8, and a pinion 10, engaging the gear rack 9. A lost motion device, limited by stops 11, and a one-way coupling 12 of the kind of a free-wheel are disposed between the drive 8, 9, 10 and the slack readjustment device 5, 7.

The gear wheel 8 is connected to a reference point, wherein the reference point is disposed such relative to the brake lever 1 that the gear rack 9 and the pinion 10 are placed in a drive motion relative to the slack readjustment device 5, 7 in case of a brake lever turn by a relative motion of the brake lever 1 with respect to the gear wheel 8. However, in case of a rotary motion of the pinion 10 within the stops 11 of the lost motion device, the drive motion is not transmitted via the one-way coupling 12 to the slack readjustment device 5, 7. The drive motion of the gear rack 9 and of the pinion 10, where the pinion 10 moves between the stops 11 of the lost motion device, corresponds to the brake lever turn between the initial position 3 and the final position 4, which brake lever turn is to correspond to a preset and predetermined brake release gap between the brake shoes and the brake drum.

FIG. 1 illustrates a brake actuating device with a brake lever 1 combined with a device for the monitoring of the brake lever turn and of the brake lining wear.

The pinion 10 is connected, fixed against rotation, via a plug connector 13, in the kind of a claw coupling or clutch, with an actuator 14. The actuator 14 thus follows the forward and backward rotary motion of the pinion 10 during brake lever turns.

Figure 2:
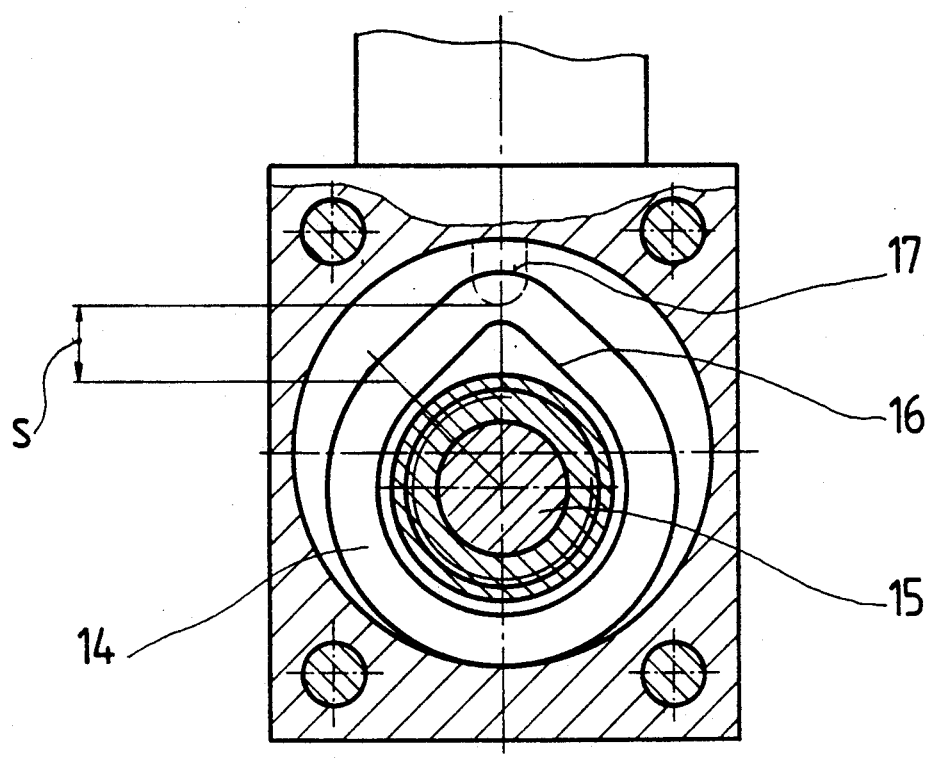
FIG. 2 is a detail view of the monitoring means according to FIG. 1.

The actuator 14 exhibits a control cam 16 (FIG. 2), disposed eccentric relative to the rotation axis 15 of the worm 7 (FIGS. 1 and 2). The control cam 16 can be pivoted for generating a first measurement distance s around the rotation axis 15 of the worm 7 and relative to a distance sensor 17 of a signal generator 18. The measurement distance s, corresponding to the brake release gap, is generated with the pivoting motion of the control cam 16 corresponding to the motion of the pinion 10. The measurement distance s is scanned by the distance sensor 17 and is communicated and transduced by the longitudinal motion of the distance sensor 17 to the signal generator 18, as illustrated in FIG. 2.

In case of a problem and a defect of the brake actuating device, such as for example an imprecise functioning of the slack readjustment device 5, 7, which results in a brake lever turn projecting beyond the end position 4, the control cam 16 is moved relative to the enlarged brake lever turn beyond its end position predefined by the end position 4 of the brake lever 1. The distance sensor 17 is then moved by the control cam 16 into a position relative to the signal generator 18 corresponding to the enlarged brake lever turn.

The worm 7 exhibits an extension 6. A bush 19 is supported on the extension 6 and is connected, fixed against rotation, to the extension 6. The connection between bush 19 and extension 6, fixed against rotation, is performed via a locking mechanism 20, effective between the extension 6 and the bush 19. The locking mechanism 20 is formed, for example, in the kind of a ball-type locking mechanism 20, pretensioned by way of a spring 21, by ratchets 22, where the ratchets 22 are disposed in an arbitrary number along the inner diameter 23 of the bush 19.

The bush 19 is furnished with an outer thread 24 which is in operating connection with an inner thread 25 of the regulating member 14. The thread connection 24, 25 operates as a transfer mechanism 24, 25 with which the regulating member 14 can be shifted in longitudinal direction corresponding to a rotary motion of the worm 7 in the sense of an adjustment motion of the slack readjustment 5, 7 relative to the rotation axis 15 of the worm 7.

The regulating member 14 exhibits an inclined face 26 serving as a control cam 26, which is inclined relative to the rotation axis 15 of the worm 7. The rotation axis 15 of the worm 7 is simultaneously the shifting axis 15 of the regulating member 14. For generating a second measurement distance n, the face 26 can be shifted in longitudinal direction relative to the rotation axis 15 and relative to the distance sensor 17. The distance sensor 17 is engaged with the control cam 26 such that the distance sensor 17 is moved relative to the signal generator 18 corresponding to the generated second measurement distance n.

The extension 6 exhibits at its free end a profiling 27, which serves for the application and engagement of a tool key. The slack readjustment device 5, 7 can be manually adjusted with said tool key. The locking mechanism 20 serves in the two adjustment directions as break safety, where the regulating member 14 has come to rest by adjustment in its end positions. The extension 6 performs a relative motion with respect to the bush 19 and the regulating chamber 14 by overpassing the locking mechanism 20.

The brake lever 1 is brought into a starting position 3 by a manual adjustment of the slack readjustment device 5, 7. The control cam 26 is disposed at the beginning of the measurement distance n relative to the distance sensor 17 for a predefined brake release gap. The enlarged pivoting of the brake lever 1, occurring in the course of the driving operation as a result of the brake lining wear is used in the above recited manner for the adjustment of the slack readjustment device 5, 7. The adjustment of the slack readjustment device 5, 7 in turn effects a relative motion of the control cam 26 versus the distance sensor 17.

The device for monitoring the brake lever turn and the brake lining wear in the kind of a signal generator 18 is fixedly connected to the brake lever 1 and is formed electrically in a conventional fashion, including a coil and a core. The core of the coil is formed by a distance sensor 17 in the kind of a scanning pin 17. The scanning pin 17 is engaged with the control cams 16 and 26 in the recited manner. The electrical signals, generatable by the signal generator 18, can be fed via electrical contacts 28 to a display device or evaluation device, respectively. These electrical signals can be used advantageously for the control of an optical or acoustical display device in the driver cabin, or for a transmission to an electrical evaluation device of a stationary diagnostic center, for example, in case of a vehicle inspection station.

Figure 3:
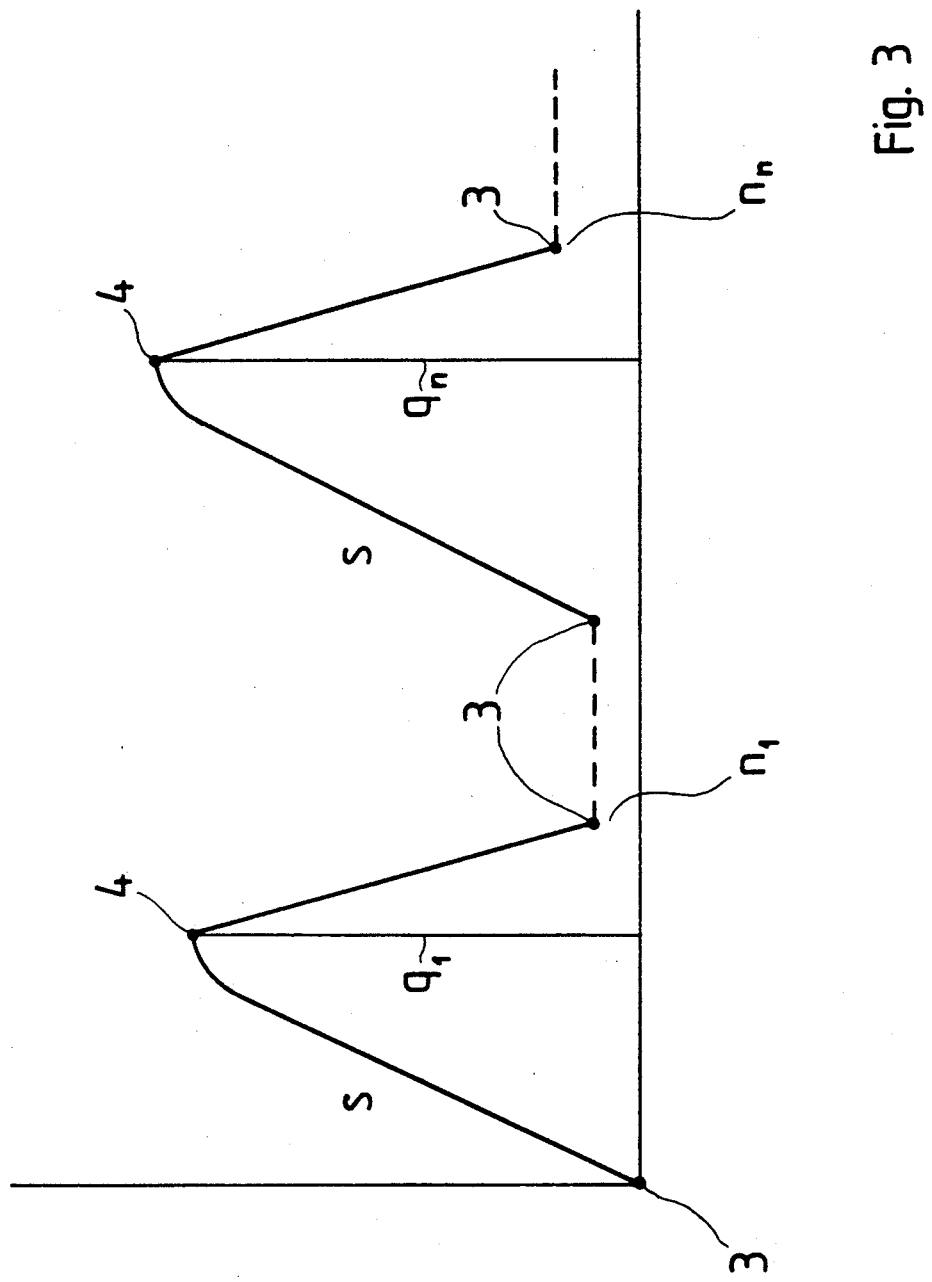
FIG. 3 illustrates a schematic diagram of the measured values of the monitoring device of FIG. 1 shown as ordinate values plotted against time.

FIG. 3 illustrates the characteristics of measurement values corresponding to the measurement distances s and $n_1$, $n_n$. The characterizing curve s, coordinated to a brake lever turn from the initial position 3 into the final position 4 upon a brake actuation, remains constant in case of a correctly operating device. The measurement distance $n_1$, $n_n$, corresponding to the brake readjustment, is enlarged with progressive adjustment. The start of the measurement distance s is consequently shifted by the amount of the measurement distance $n_1$, $n_n$.

The distance sensor 17 scans a regulating distance $q_1$, $q_n$, generated with the regulating member 14, where the regulating distance $q_1$, $q_n$ is generated by superpositioning the measurement distances s and $n_1$, $n_n$. The evaluation device recognizes the differing characteristics of the signals s' and $n'_1$, $n'_n$ coordinated to the measurement distances s and $n_1$, $n_n$ and the evaluation device can, for example, filter out the signal $n'_1$, $n'_n$ by suppressing the constant signal s'.

In case of a constant signal s' and of a continuous change of the signal $n'_1$, $n'_n$, one can conclude that the brake and monitoring device is intact and operating properly. A constant signal $n'_1$, $n'_n$ and a change of the signal s' furnishes, for example, information relative to an imperfect functioning of the adjustment of the brake lining wear.

The capturing of the measurement distance $n_1$, $n_n$ is for example also possible in such cases where a characteristic identification signal is added to the signal of the regulating distance $q_1$, $q_n$. The evaluation device recognizes the non-actuated starting position 3 of the brake lever 1 from this characteristic identification signal. The regulating distance $q_1$, $q_n$ would correspond in the presence of such a characteristic identification signal to the measurement distance $n_1$, $n_n$ generated by the cam 26. The characteristic identification signal could for example be generated with a switch, where the switch would have to be installed at an arbitrary position of the actuatable part of the brake device.

It will be understood that each of the elements described above, or two or more together, may also find a useful application in other types of operating systems differing from the types described above.

While the invention has been illustrated and described as embodied in the context of a brake actuating device with a means for an adjustment of a brake, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed and desired to be protected by Letters Patent is set forth in the appended claims.

1. A brake actuating device comprising
a brake shaft having a rotation axis;
a worm wheel, disposed fixed against rotation on the brake shaft;
a brake lever performing together with the brake shaft a pivoting motion around the rotation axis of the brake shaft, where the pivoting motion of the brake lever serves for actuation of a brake in the sense of overcoming a brake release gap for the purpose of bringing a brake lining closer to a brake drum;
a slack readjustment device connected to and between the brake lever and the brake shaft, where the brake shaft is adjustable relative to the brake lever around the rotation axis of the brake shaft by means of the slack readjustment device, in the sense of a maintaining of the brake release gap upon wear of the brake lining, and including a worm engaging the worm wheel thereby forming the slack readjustment device in a kind of a worm drive;
a regulating member connected to the slack readjustment device and actuatable depending on the pivoting motion of the brake lever for generating a first measurement distance corresponding to an overcoming of a brake release gap, and said regulating member further actuatable depending on the adjustment motion of the slack readjustment device for generation of a second measurement distance, corresponding to the brake lining wear, and said regulating member adapted for superpositioning the first measurement distance and the second measurement distance to generate a regulating distance from a superpositioning of the first measurement distance and of the second measurement distance;
a distance sensor engaged by the regulating member;
a signal generator connected to the distance sensor and serving for scanning the regulating distance and for generating a signal corresponding to the regulating distance;
an evaluation device connected to the signal generator for comparing the characteristics of the first measurement distance and of the second measurement distance and for decomposing a signal corresponding to the regulating distance into a first signal corresponding to the first measurement distance, and into a second signal corresponding to the second measurement distance.

2. The brake actuating device according to claim 1, wherein the regulating member includes a control cam disposed eccentrically relative to the rotation axis of the worm of the slack readjustment device, where the control cam can be tilted around a rotation axis of the worm and with respect to the distance sensor for generation of the first measurement distance; and
wherein the regulating member includes a face inclined relative to the rotation axis of the worm, wherein the face is shiftable in a longitudinal direction relative to the rotation axis of the worm and of the distance sensor for generating the second measurement distance.

3. The brake actuating device according to claim 2, wherein
the second measurement distance is generated depending on the adjustment motion of the worm of the slack readjustment device.

4. The brake actuating device according to claim 3, wherein
the worm is disposed in the brake lever, and wherein the worm includes an extension forming a single piece with the worm,
wherein the extension extends outside of the brake lever and further comprising a transfer mechanism disposed between the extension and the regulating member for transforming an adjustment motion of the worm into a motion of the regulating member in a direction disposed parallel to the rotation axis of the worm.

5. The brake actuating device according to claim 4, wherein
the transfer mechanism is formed by an inner thread of the regulating member, and wherein the inner thread is engaged with an outer thread disposed fixedly against rotation relative to the extension.

6. The brake actuating device according to claim 5, wherein
the outer thread, fixedly disposed relative to the extension, is further disposed on a bush surrounding the extension and wherein the bush is fixed against rotation relative to the extension.

7. The brake actuating device according to claim 6, further comprising
a locking mechanism operating between the bush and the extension, wherein the locking mechanism is capable of bringing the bush and the extension into a desired locking and engagement position.

8. The brake actuating device according to claim 3, wherein
the worm is disposed in the brake lever and includes an extension, connected to the worm and fixed in position against rotation relative to the worm, wherein the extension extends outside of the brake lever and further comprising a transfer mechanism disposed between the extension and the regulating member for transforming an adjustment motion of the worm into a motion of the regulating member in a direction disposed parallel to the rotation axis of the worm.

9. The brake actuating device according to claim 1, further comprising
a drive disposed at and connected to the automatic slack readjustment device and serving for actuating the automatic slack readjustment device, wherein the drive carries out a relative motion relative to the brake lever in dependence of the pivoting motion of the brake lever, and wherein the drive includes a pinion rotatable jointly with the pivoting motion of the brake lever, wherein the rotation motion of the pinion serves for generating the first measurement distance and is transferable onto the regulating member.

10. The brake actuating device according to claim 9, wherein the pinion is disposed in the brake lever and is connected, fixed against rotation, to the regulating member.

11. The brake actuating device according to claim 10, wherein
the connection of the pinion to the regulating member is fixed against rotation and is formed by a plug connector, and wherein the plug connector allows a longitudinal shifting of the regulating member relative to its shifting axis.

12. The brake actuating device according to claim 1, wherein
the distance sensor connected to the signal generating is formed as a contact pin, and wherein the contact pin is engaged with the regulating member for furnishing the regulating distance.

13. The brake actuating device according to claim 1, wherein
a signal, corresponding to the non-actuated state of the brake device, is fed to the evaluation device and serves there for a recognition of the second measurement distance.

14. A brake actuating device with a means for slack readjustment of a brake, in particular of a vehicle brake, comprising
(a) a brake lever performing together with a brake shaft a pivoting motion around a rotation axis of the brake shaft, where the pivoting motion serves for actuation of a brake in the sense of overcoming a brake release gap for the purpose of bringing a brake lining closer to a brake drum;
(b) a slack readjustment device furnished between the brake lever and the brake shaft, where the brake shaft is adjustable relative to the brake lever around the rotation axis of the brake shaft by means of the slack readjustment device, in the sense of a maintaining of the brake release gap upon wear of the brake lining;
(c) a worm wheel, disposed fixed against rotation on the brake shaft, and a worm engaged with the worm wheel thereby forming the slack readjustment device in a kind of a worm drive; wherein
(d) a regulating member is furnished which can be actuated for generating a first measurement distance, corresponding to the overcoming of the brake release gap, depending on the pivoting motion of the brake lever;
(e) the regulating member is actuatable further for generation of a second measurement distance, corresponding to the brake lining wear, depending on the adjustment motion of the slack readjustment device;
(f) a regulating device can be generated with the regulating member, where the regulating distance is formed from superpositioning the first measurement distance and the second measurement distance;
(g) a signal generator is furnished with a distance sensor, where the signal generator serves for scanning the regulating distance and generates a signal corresponding to the regulating distance;
(h) an evaluation device is furnished with which a comparison of the characteristics of the first and second measurement distances and can be performed, where the signal, corresponding to the regulating distance, can be decomposed into a first signal corresponding to the first measurement distance, and into a second signal corresponding to the second measurement distance.

15. The device according to claim 14, further comprising
(a) an automatic slack readjustment device furnished with a drive, where the drive serves for an actuation of the automatic slack readjustment device;
(b) wherein the drive carries out a relative motion relative to the brake lever in dependence of the pivoting motion of the brake lever,
(c) wherein the drive exhibits a pinion rotatable with the pivoting motion of the brake lever, where the rotation motion of the pinion, serving for a generation of the first measurement distance, is transferable onto the regulating member;
(d) wherein the pinion is disposed in the brake lever (1) and is connected, fixed against rotation, to the regulating member;
(e) wherein the connection of the pinion with the regulating member is fixed against rotation and is formed by a plug connector, where the plug connector allows a longitudinal shifting of the regulating member relative to its shifting axis.

16. The device according to claim 14, wherein
(a) the regulating member exhibits a control cam, disposed eccentrically relative to the rotation axis of a worm coordinated to the slack readjustment device, where the control cam can be tilted around the rotation axis of the worm and with respect to the distance sensor for generation of the first measurement distance;
(b) wherein the regulating member exhibits a face inclined relative to the rotation axis of the worm, where the face is shiftable in longitudinal direction relative to the rotation axis of the worm and of the distance sensor for a generation of the second measurement distance, wherein the second measurement distance can be generated, depending on the adjustment motion of the worm, coordinated to the slack readjustment device.

17. The device according to claim 16, wherein
(a) the worm is disposed in the brake lever and exhibits an extension, forming at least one of a one-piece with the worm and connected, fixed against rotation to the worm, where the extension (6) extends outside of the brake lever;
(b) a transfer mechanism is furnished between the extension and the regulating member for transforming the adjustment motion of the worm into a motion of the regulating member alongside of the rotation axis of the worm;

(c) wherein the transfer mechanism is formed by an inner thread of the regulating member, and wherein the inner thread is engaged with an outer thread, connected fixed against rotation to the extension;

(d) wherein the outer thread, coordinated to the extension, is disposed on a bush, wherein the extension is surrounded by the bush and connected, fixed against rotation, to the bush;

(e) wherein a locking mechanism is furnished and acts between the bush and the extension, where the bush and the extension can be brought by the locking mechanism into an arbitrary locking and engagement position.

18. The device according to claim 14, wherein the distance sensor of the signal generator is formed as a contact pin, where the contact pin is engaged with the regulating member for generation of the regulating distance.

19. The device according to claim 14, wherein a signal, corresponding to the non-actuated state of the brake device, is fed to the evaluation device and serves there for a recognition of the measurement distance.

20. A method for actuating a brake device comprising pivoting a brake lever together with a brake shaft over an angle around a rotation axis of the brake shaft;

actuating a brake in the sense of overcoming a brake release gap for the purpose of bringing a brake lining closer to a brake drum based on the pivoting motion of the brake lever;

engaging a worm wheel with a worm forming part of a slack readjustment device, wherein the worm wheel is disposed fixed against rotation on the brake shaft, and wherein the slack readjustment device is formed in a kind of a worm drive;

adjusting the position of the brake shaft relative to the brake lever around the rotation axis of the brake shaft, by means of the slack readjustment device, connected to and between the brake lever and the brake shaft, in the directional sense of a maintaining of the brake release gap upon wear of the brake lining;

actuating a regulating member connected to the slack readjustment device based on the pivoting motion of the brake lever for generating a first measurement distance (s) corresponding to an overcoming of the brake release gap; further actuating said regulating member depending on the adjustment motion of the slack readjustment device for generation of a second measurement distance (n), corresponding to the brake lining wear;

superpositioning the first measurement distance (s) and the second measurement distance (n) to generate a regulating distance (q) from a superpositioning of the distance (s) and of the distance (n) with said regulating member;

engaging a distance sensor with the regulating member for generating a signal;

feeding the signal from the distance sensor to a signal generator connected to the distance sensor;

scanning the regulating distance (q) in the signal generator;

generating a signal corresponding to the regulating distance (q) in the signal generator;

feeding the signals generated in the signal generator to an evaluation device connected to the signal generator;

comparing the characteristics of the first measurement distance (s) and of the second measurement distance (n) in the evaluation device.

21. The method for actuating a brake device according to claim 20 further comprising decomposing a signal corresponding to the regulating distance into a first signal corresponding to the first measurement distance, and into a second signal corresponding to the second measurement distance.

* * * * *